Jan. 2, 1951
F. POVONDRA
2,536,215
HOLDER AND CARRIER FOR KITCHEN WASTE CONTAINERS PROVIDED WITH PICKUP TOOL SCRAPING MEANS
Filed Nov. 19, 1947
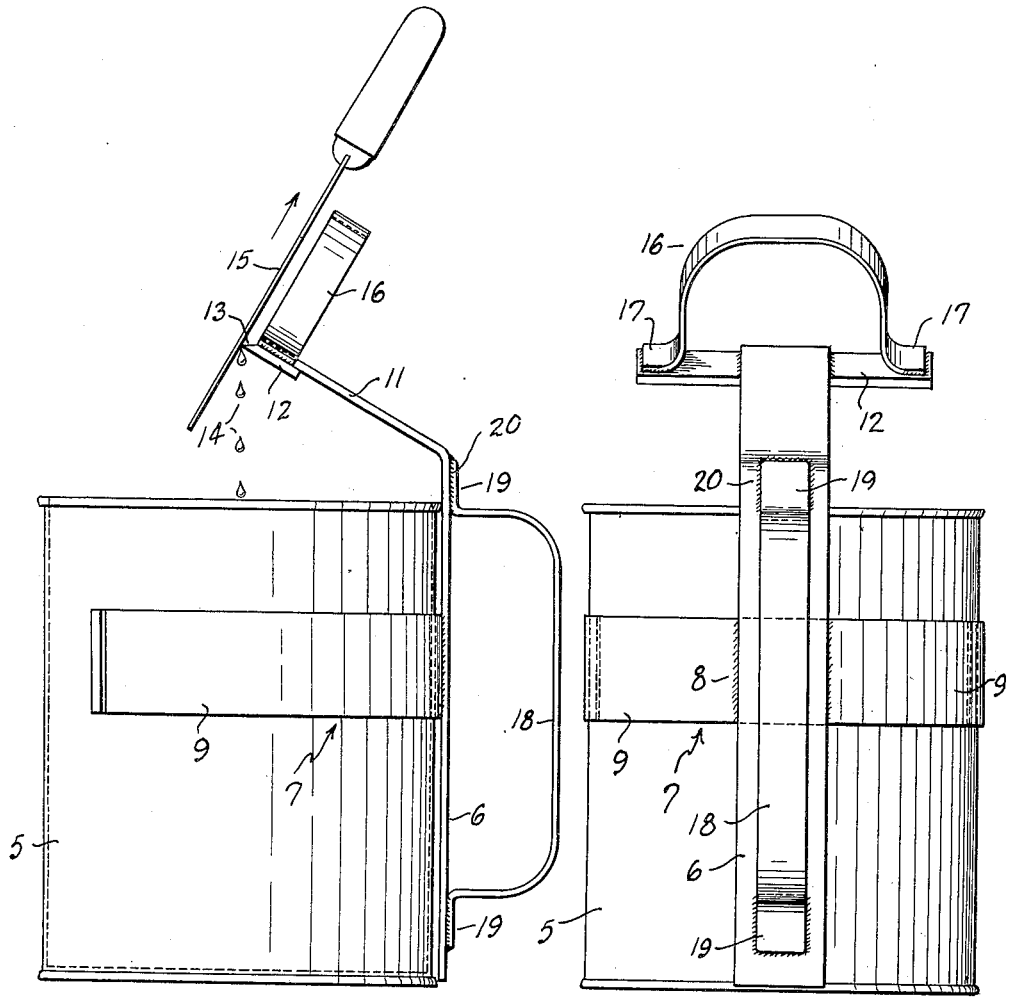
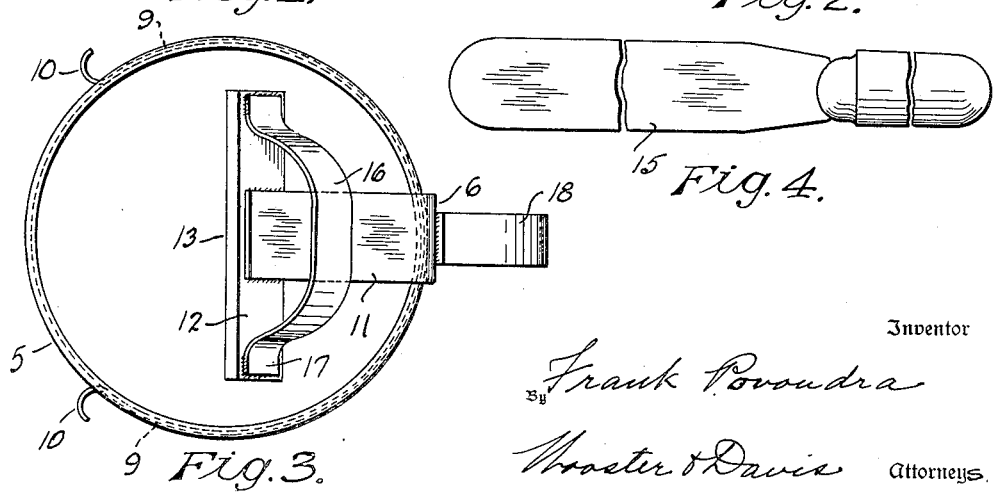
Inventor
Frank Povondra
By Wooster & Davis Attorneys Patented Jan. 2, 1951

2,536,215

UNITED STATES PATENT OFFICE 2,536,215

HOLDER AND CARRIER FOR KITCHEN WASTE CONTAINERS PROVIDED WITH PICKUP TOOL SCRAPING MEANS

Frank Povondra, Bridgeport, Conn.

Application November 19, 1947, Serial No. 786,992

2 Claims. (Cl. 15—236)

This invention relates to a holder for a container to be used in collecting various materials such, for example, as an empty tin can for holding waste fats and greases in a kitchen, and has for an object to provide a simple and effective device which will hold an empty container or similar device while one uses a spatula, knife or the like to scrape, for example, burned grease and similar material from a griddle or similar pan on which hamburgers or other food articles have been cooked, and place this grease in a container.

Another object is to provide a means which will facilitate holding a container during this operation in the most effective manner in a hand of the operator, and another object is to provide a means to prevent injury to the operator from the knife or spatula in the operation of scraping the grease from this knife or other device.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view of the device showing it holding the can or container in proper position and showing how it is used to scrape the grease or other material from the spatula;

Fig. 2 is a view looking from the right of Fig. 1;

Fig. 3 is a top plan view, and

Fig. 4 is a view of a spatula or similar knife or other article which may be used for the scraping operation.

The container, such, for example, as a tin can open at the top, is shown at 5, and the holding device for this container comprises an upright metal strap or bar 6 which may be of different shapes as found desirable, but is preferably a substantially flat strip of metal of suitable width and thickness, as indicated. Secured to this upright strap or bar is a strap 7 of resilient metal secured intermediate its length to the member 6 by any suitable means such, for example, as welding or soldering 8 so as to provide curved arms 9 extending in opposite directions from the member 6 to embrace and clamp the body of the container 5 and hold it in position, the size of the opening between these arms being smaller than the diameter of the can or container when removed from the container, so that when it is inserted in these arms they are expanded and the container will be gripped and held by the spring or resilient action of these arms. Their free ends are preferably curved outwardly, as indicated at 10, to facilitate insertion of the container between them. These arms may be of different shapes but are also preferably straps of substantially flat metal of suitable gauge or thickness as shown.

The upper portion of the strap or bar 6 is inclined forwardly and upwardly over the top of the container, as indicated at 11, and adjacent its forward end and over the open top of the container is provided with a transverse scraping blade secured to it by any suitable means, such as welding, soldering or the like. At its forward or upper edge this blade is provided with a knife edge 13 over the open top of the container forming a scraping edge to scrape grease or similar material, indicated by the drops 14, from a spatula, knife or similar article 15 which has been used to scrape such material from a griddle, pan or similar device in which food articles have been cooked. It will be clear this cleaning edge effectively cleans material from the spatula or knife in such a way that it readily drops into the container 5. To prevent injury to the hand of the operator holding the device by the spatula or knife 15 moving backwardly at its lower end as it passes or snaps backwardly off the blade edge 13, a guard 16 is provided to the rear of this scraping edge and extending upwardly and transversely. This may be of different shapes but is preferably a flat strip of metal of substantially inverted U shape, and having laterally bent feet 17 by means of which it is secured to the blade 12 by any suitable means. A hand grip or handle 18 extends rearwardly from the upright member 6, and this may be of any suitable shape and secured to the member 6 by any suitable means. In the form shown it comprises a flat metal strip bent to form a loop with the member 6 and having laterally extending feet 19 at its opposite ends for securing it to the member 6 by any suitable means, such, for example, as soldering or welding 20.

In use, the housewife or other user holds the device in the upright position by means of the handle 18 and slips the container or can 5 into the curved spring gripping arms 9. Then she may use the blade of the spatula 15, knife, or other similar device to scrape the fat, burned grease and the like from the top of a griddle or pan or other utensil, and this will be picked up on the flat side of the blade. Then she scrapes this flat side against the edge of the blade 13, as indicated in Fig. 1, by drawing the blade 15 upwardly across this edge. This scrapes all the material off the blade so that it drops into the container, the guard 16 preventing the blade 15, as its edge runs off the edge 13, from flying back onto the hand or arm of the user and cutting or otherwise injuring it.

It will be evident this is a very simple device which effectively holds the container in the most convenient position for use, and it facilitates removal of the grease or similar material to the container, obviating liability of burning the operator from this hot material and facilitating carrying of the container with this material to any desired location. It also greatly facilitates the transfer of the material from the cooking utensil to the grease container.

Having thus set forth the nature of my invention, I claim:

1. A holder of the character described comprising a strap having an upright portion adapted to lie along an upright side of a container such as an open topped tin can, curved spring arms secured to said strap and extending laterally in opposite directions therefrom to embrace and hold the can, the upper portion of the strap being inclined upwardly and forwardly over the open top of the can, a transverse blade carried by said inclined portion over the top of the can and provided with a scraping edge on its forward edge, an upwardly extending guard transverse to said inclined portion and located to the rear of said scraping edge to limit backward movement of a knife blade drawn upwardly over and past the scraping edge, and a hand grip on the rear side of said upright portion of the strap for carrying and holding the container.

2. A holder of the character described comprising a strap having an upright portion adapted to lie along an upright side of a container such as an open topped tin can, curved spring arms secured to said strap and extending laterally in opposite directions therefrom to embrace and hold the can, the upper portion of the strap being inclined upwardly and forwardly over the open top of the can, a transverse blade carried by said inclined portion over the top of the can with its forward edge forming a scraping edge, an upwardly looped strap transverse to the said inclined portion and located to the rear of the scraping edge to form a guard to limit backward movement of a knife blade drawn upwardly over and past the scraping edge, and an upright hand grip on the rear side of the upright portion of the strap.

FRANK POVONDRA.

REFERENCES CITED

The following references are of record in the file of this patent:

UNITED STATES PATENTS

| Number | Name | Date |
|---|---|---|
| 810,640 | Greener | Jan. 23, 1906 |
| 830,763 | Bradbury | Sept. 11, 1906 |
| 1,474,077 | Grundhand et al. | Nov. 13, 1923 |
| 1,698,403 | Harris | Jan. 8, 1929 |
| 1,863,585 | Walker | June 21, 1932 |